United States Patent [19]

Kanbara

[11] Patent Number: 5,768,016
[45] Date of Patent: Jun. 16, 1998

[54] ELECTRO-MECHANICAL TRANSDUCER LENS DRIVE MECHANISM FOR A VIBRATION COMPENSATING LENS SYSTEM

[75] Inventor: Tetsuro Kanbara, Sakai, Japan

[73] Assignee: Minolta Co., Ltd., Osaka, Japan

[21] Appl. No.: 506,913

[22] Filed: Jul. 26, 1995

[30] Foreign Application Priority Data

Aug. 3, 1994 [JP] Japan ................................. 6-200269

[51] Int. Cl.$^6$ ............................. G02B 27/64; G03B 13/00
[52] U.S. Cl. ........................... 359/557; 359/554; 396/55
[58] Field of Search .......................... 359/554–557,
359/696–706, 694; 354/202, 400–404, 70,
430; 310/317, 328; 396/52–55, 421

[56] References Cited

U.S. PATENT DOCUMENTS

| | | | |
|---|---|---|---|
| 4,195,243 | 3/1980 | Thaxter | 310/317 |
| 4,415,861 | 11/1983 | Palmquist et al. | 327/176 |
| 4,780,739 | 10/1988 | Kawakami et al. | 354/70 |
| 4,864,339 | 9/1989 | Gross et al. | 354/202 |
| 4,894,579 | 1/1990 | Higuchi et al. | 310/328 |
| 4,912,493 | 3/1990 | Tanaka | 354/400 |
| 5,000,549 | 3/1991 | Yamazaki | 359/557 |
| 5,069,537 | 12/1991 | Kitagishi | 359/557 |
| 5,153,633 | 10/1992 | Otani | 354/70 |
| 5,225,941 | 7/1993 | Saito et al. | 359/824 |
| 5,305,040 | 4/1994 | Enomoto | 354/202 |
| 5,581,317 | 12/1996 | Kitagawa et al. | 396/55 |
| 5,619,735 | 4/1997 | Kai | 396/55 |

*Primary Examiner*—Thong Nguyen
*Attorney, Agent, or Firm*—Burns, Doane, Swecker & Mathis, LLP

[57] ABSTRACT

A lens system for compensating for shaking movement of a camera includes an objective lens system that forms the image and a compensating lens system interposed in the optical axis of the objective lens system. The compensating lens elements are driven by electro-mechanical transducers, which provides a compact system permitting a relatively small lens construction. A driving shaft is frictionally coupled to a support for the compensating lens elements and is attached to an electro-mechanical transducer, for example, a piezoelectric element that expands and contracts responsive to a pulse wave. A movement detector monitors the objective lens system and calculates an amount of shaking compensation needed, which is provided to a pulse generator.

23 Claims, 4 Drawing Sheets

ELECTRO-MECHANICAL TRANSDUCER LENS DRIVE MECHANISM FOR A VIBRATION COMPENSATING LENS SYSTEM

BACKGROUND OF THE INVENTION

1. Field of the Invention

This invention relates to a lens drive mechanism using an electro-mechanical transducer, and more particularly to a lens drive mechanism suitable for the driving of a compensation lens that compensates for camera shake.

2. Description of the Related Art

A known device to compensate for image blurriness on an image forming surface caused by shaking of the camera during photo-taking, includes a shake prevention optical system in which compensation lenses located directly behind the aperture of the photo-taking lens are eccentrically driven within a plane perpendicular to the optical axis. The compensation lenses in this shake prevention optical system have dedicated drive mechanisms that drive these compensation lenses in prescribed directions.

As mechanisms to drive the compensation lenses of said shake prevention optical system, drive mechanisms such as those comprising a DC motor and a reduction gear mechanism have been conventionally used. However, with this type of construction, not only is the motor large, but a large space is also required for the reduction gear mechanism because a mechanism to eliminate backlash is included in it. Consequently, the lens mount must be made large. An additional disadvantage of this construction is that the reduction gear mechanism makes noise when it operates, which reduces the quality of the product.

SUMMARY OF THE INVENTION

An object of the present invention is to provide a drive mechanism that solves the problems described above.

Another object of the present invention is to provide a drive mechanism that prevents the lens system from becoming large. More specifically, in order to prevent the lens system from becoming large, the present invention drives the lens using a compact mechanism.

Yet another object of the present invention is to drive the compensation lenses that compensate for camera shake using compact mechanisms.

Yet another object of the present invention is to drive the compensation lenses that compensate for camera shake without vibration.

Yet another object of the present invention is to provide a drive mechanism that generates little noise when operated.

According to the invention, a lens system for compensating for shaking movement of a camera includes an objective lens system that forms the image and a compensating lens system interposed in the optical axis of the objective lens system. The compensating lens elements are driven by electro-mechanical transducers, which provides a compact system permitting a relatively small lens construction. A driving shaft is frictionally coupled to a support for the compensating lens elements and is attached to an electro-mechanical transducer, for example, a piezoelectric element that expands and contracts responsive to a pulse wave. A movement detector monitors the objective lens system and calculates an amount of shaking compensation needed, which is provided to a pulse generator.

These and other objects and features of the present invention will become apparent from the following description of a preferred embodiment thereof taken in conjunction with the accompanying drawings.

BRIEF DESCRIPTION OF THE DRAWINGS

In the following description, like parts are designated by like reference numbers throughout the several drawings.

DETAILED DESCRIPTION

According to an embodiment of the present invention described below, a lens optical axis is deemed the z axis, and the coordinate axes perpendicular to this axis are deemed the x axis and the y axis. The explanation below will make reference to said coordinate axes throughout the explanation.

Figure 1:
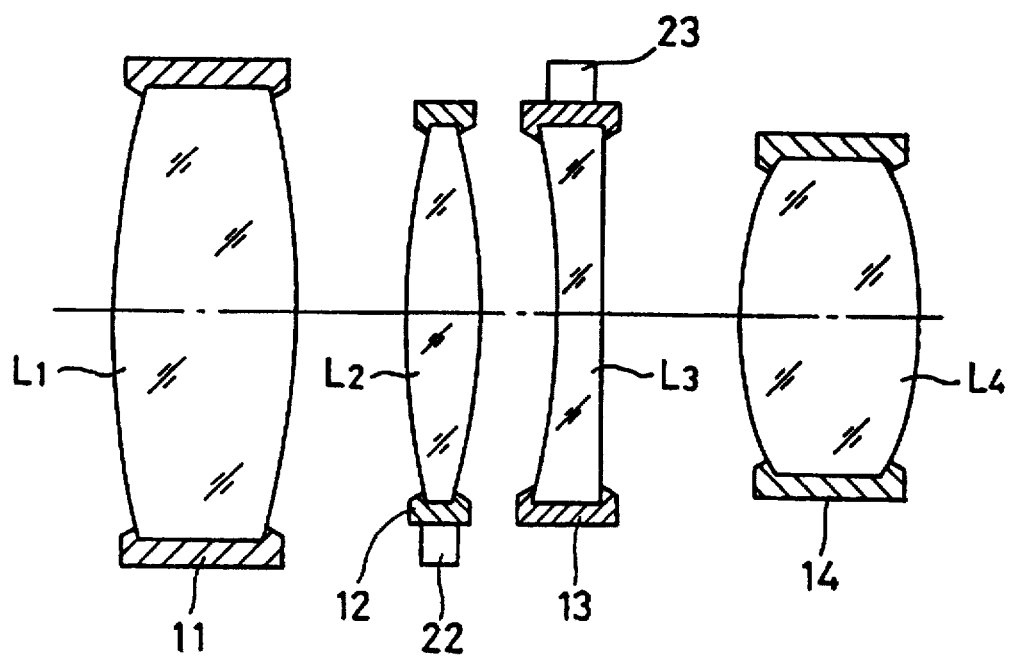
FIG. 1 is a cross-sectional view of a construction of a lens system equipped with a shake prevention optical system in which the present invention is applied.

FIG. 1 is a cross-sectional view of a construction of a lens system equipped with a shake prevention optical system in which the present invention is applied. The lens system comprises first lens unit L1 and fourth lens unit L4, which comprise the objective lens for forming an image of the object. A second lens unit L2 and third lens unit L3 comprising a shake prevention optical system-are placed between first lens unit L1 and fourth lens unit L4. First lens unit L1 and fourth lens unit L4 are supported by lens holding frames 11 and 14 respectively, and are attached to a lens mount not shown in the drawing.

Second lens unit L2 and third lens unit L3 comprising the shake prevention optical system are supported by lens holding frames 12 and 13 equipped with actuators 22 and 23 described below, respectively. Second lens unit L2 is constructed so as to be eccentrically movable in the direction of the x axis by means of actuator 22, while third lens unit L3 is constructed so as to be eccentrically movable in the direction of the y axis by means of actuator 23.

The construction of the actuators will now be explained. Since actuator 22 and 23 have identical constructions, and differ only in the direction of their mounting, explanation will be given with reference to actuator 22.

Figure 2:
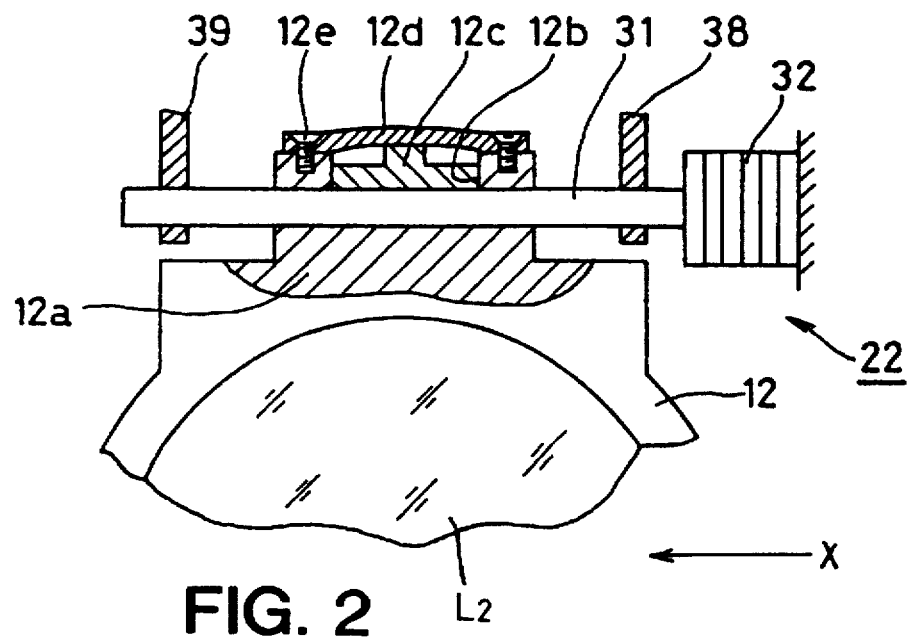
FIG. 2 is a cross-sectional view of a construction of an actuator for the drive system of FIG. 1.

FIG. 2 is a cross-sectional view of the construction of actuator 22. A drive shaft 31 is supported by support members 38 and 39 extending from the lens mount not shown in the drawing so as to be movable in the direction of the x axis. A piezoelectric element 32 that varies in thickness in response to impressed pulses is affixed via an adhesive to a lens mount extension not shown in the drawing, while the other end of piezoelectric element 32 is affixed via an adhesive to one end of drive shaft 31.

Connector 12a connected via friction to drive shaft 31 is integrally mounted to lens holding frame 12. Drive shaft 31 extends through an opening in connector 12a, and a notch 12b to expose the drive shaft 31 is formed in the middle of connector 12a. A pad 12c is disposed in the notch 12b to contact the drive shaft 31. A plate spring 12d affixed to connector 12a using screw 12e is placed in notch 12b over the pad 12c to apply force to the pad 12c. In other words, pad 12c is pressure-welded to drive shaft 31. By this construction, drive shaft 31 and lens holding frame 12 are connected by connector 12a via friction due to application of the appropriate amount of pressure.

A detailed explanation of actuator 23 is omitted. In the discussion below, and as illustrated in FIG. 3, actuator 23 includes a drive shaft 41, a piezoelectric element 42, support members 48 and 49, a connector 13a, a notch 13b, a pad 13c, and a plate spring 13d identical to the elements described for actuator 22.

Figure 3:
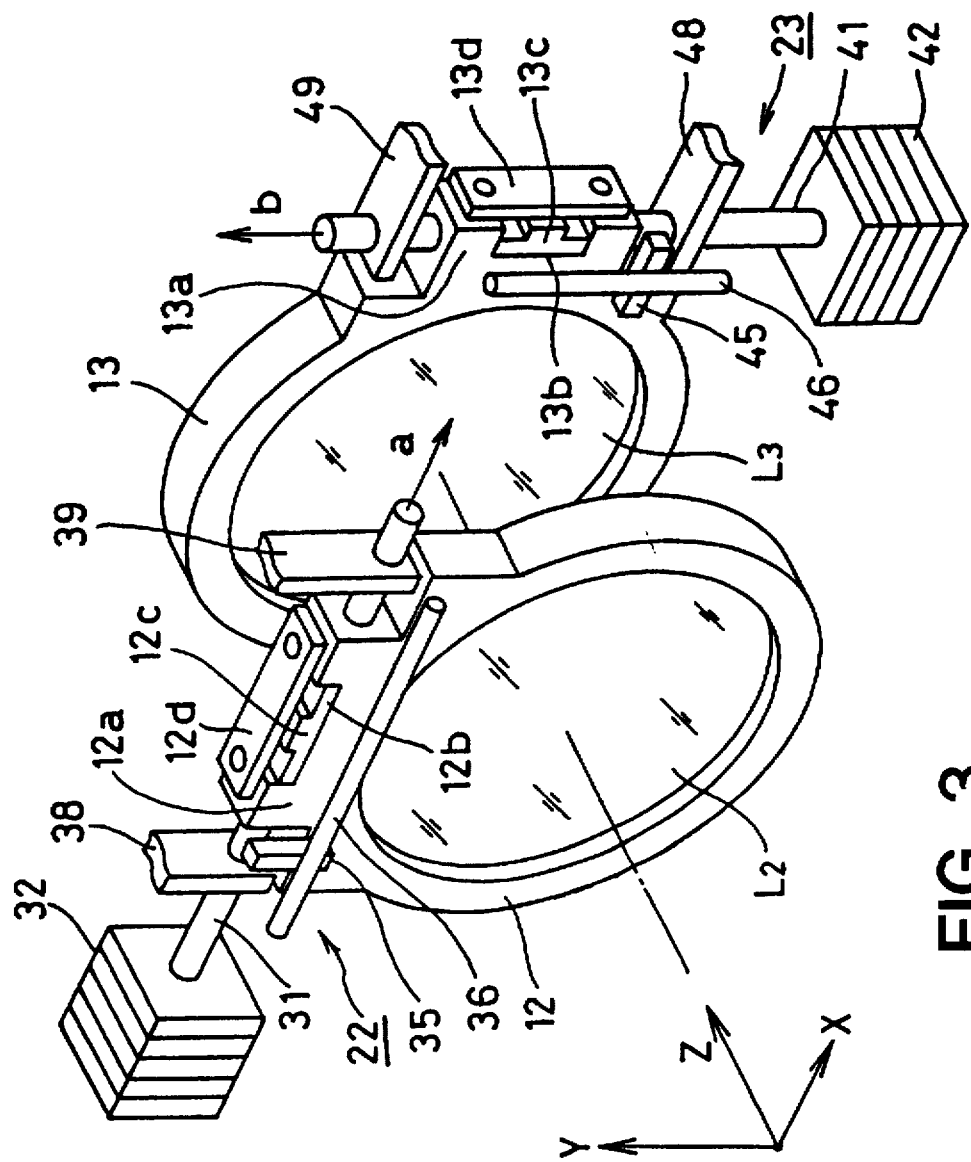
FIG. 3 is a perspective view of a construction of the drive mechanisms of the shake prevention optical system.

FIG. 3 is a perspective view of a construction of the drive mechanisms of the shake prevention optical system. Drive shaft 31 of actuator 22 which causes second lens unit L2 to move in an eccentric fashion is placed parallel to the x axis, and drive shaft 41 of actuator 23 which causes third lens unit L3 to move in an eccentric fashion is placed parallel to the y axis.

The position of second lens unit L2 along the x-axis is detected by x axis position sensor 35 attached to lens holding frame 12. The position of third lens unit L3 along the y axis is detected by y axis position sensor 45 attached to lens holding frame 13.

Here, x axis position sensor 35 and y axis position sensor 45 are known position sensors. For example, magnetic resistance sensor system in which magnetic rods 36 (46) are placed at prescribed intervals parallel to drive shaft 31 (41) in an extension of the lens mount not shown in the drawing and in which the magnetism of magnetic rods 36 (46) is detected by sensor 35 (45) comprising a magnetic resistance element attached to lens holding frame 12 (13) may be used. Various other types of position sensors may also be used.

Drive shaft 31 or 41 may also be used as the magnetic rod. In this case, no special attention need be given to ensure that magnetic rod and drive shaft are parallel. However, the construction should be such that the output of position sensor 35 (45) may be obtained when the drive shaft 31 (41) is not operating.

The driving of second lens unit L2 and third lens unit L3 by actuators 22 and 23, respectively, will now be explained with reference to FIG. 3.

Figure 5:
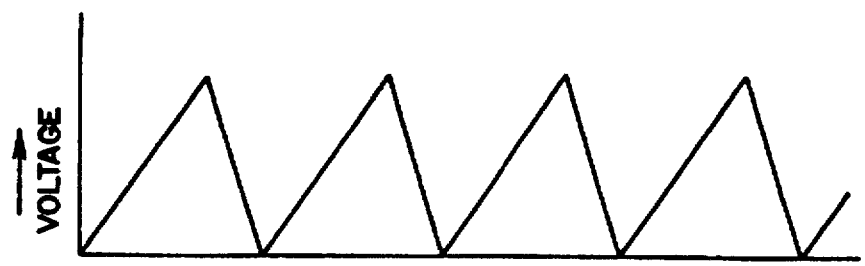
FIG. 5 is a drawing showing a wave form of drive pulses impressed to an electro-mechanical transducer.

When wave form drive pulses, each comprising a gentle-sloped rising edge and a steep-sloped falling edge following it as shown in FIG. 5, are impressed to piezoelectric element 32 of actuator 22, piezoelectric element 32 slowly expands in thickness at the gentle sloped rising edge of the drive pulse, whereby drive shaft 31 moves in the direction indicated by arrow a. Consequently, lens holding frame 12 connected via friction to drive shaft 31 by connector 12a also moves in the direction indicated by arrow a. As a result, second lens unit L2 may also be moved in a positive direction along the x axis indicated by arrow a.

At the steep-sloped falling edge of the drive pulse, piezoelectric element 32 rapidly shrinks in thickness, whereby drive shaft 31 moves in the opposite direction from that indicated by arrow a. When this happens, lens holding frame 12 connected to drive shaft 31 via friction by connector 12a virtually stays in the position at that time because inertia of the lens L2 and holding frame 12 overcomes the friction-welding force between connector 12a and the drive shaft 31. As a result, second lens unit L2 does not move.

'Virtually' here refers to the situation in which connector 12a of lens holding frame 12 follows the movement of drive shaft 31 while lagging behind due to slipping and moves in either the direction of arrow a or the opposite direction, all of said members as a whole moving in the direction of arrow a based on the difference in drive time. The nature of the movement is determined by the friction conditions present at the time.

Through the continuous impression of said wave form drive pulses to piezoelectric element 32, second lens unit L2 is continuously moved along the x axis in a positive direction.

When second lens unit L2 is to be moved along the x axis in a negative direction, or in other words opposite the direction indicated by arrow a, this movement may be achieved by impressing wave form drive pulses, each comprising a steep-sloped rising edge and a gentle-sloped falling edge following it, to piezoelectric element 32.

The driving of third lens unit L3 by actuator 23 is exactly the same. By impressing drive pulses onto piezoelectric element 42 of actuator 23, third lens unit L3 may be moved along the y axis as indicated by arrow b (positive and negative directions).

Furthermore, by making the frequency of the drive pulse 20 kHz or higher, the noise from the operation of the actuator may be made inaudible to the human ear.

Figure 4:
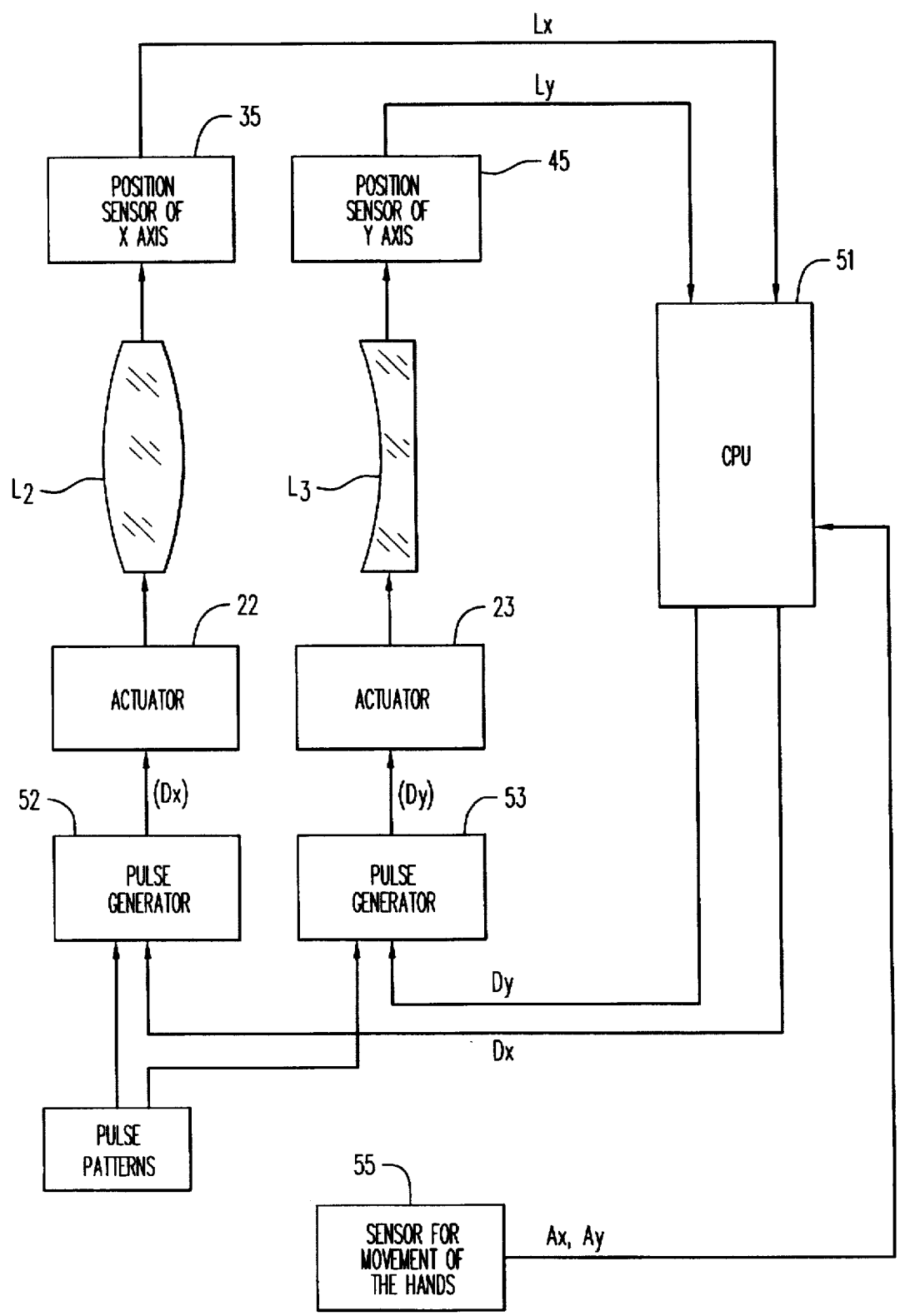
FIG. 4 is a block diagram of a control circuit that controls compensation for camera shake using the shake prevention optical system.

FIG. 4 is a block diagram of a control circuit that performs camera shake compensation by means of the shake prevention optical system. The control circuit comprises CPU 51, shake detection sensor 55, x axis position detection sensor 35 that detects the position of second lens unit L2 along the x axis, and y axis position detection sensor 45 that detects the position of third lens unit L3 along the y axis, all of which are connected to the input ports of CPU 51, as well as actuator 22 that moves second lens unit L2 in an eccentric fashion, actuator 23 that moves third lens unit L3 in an eccentric fashion, and drive pulse generators 52 and 53, all of which are connected to the output ports of CPU 51.

Shake detection sensor 55 located on the camera side detects the amount of camera shake occurring in the camera, and comprises an acceleration sensor that detects amounts Ax and Ay of acceleration of the camera along the x and y axes. Detected acceleration amounts Ax and Ay are integrated twice by CPU 51, through which camera shake amounts Mx and My may be determined.

The operation of the control circuit will now be explained. First, the amount of camera shake Mx along the x axis and the amount of camera shake My along the y axis are calculated from acceleration amounts Ax and Ay along the x and y axes, respectively, detected by camera shake detection sensor 55. Next, position Lx of second lens unit L2 along the x axis is detected by x axis position detection sensor 35, and position Ly of third lens unit L3 along the y axis is detected by y axis position detection sensor 45. Amount of drive Dx for second lens unit L2 along the x axis and amount of drive Dy for third lens unit L3 along the y axis are calculated based on camera shake amounts Mx and My, position Lx of second lens unit L2 along the x axis and position Ly of third lens unit L3 along the y axis. Drive pulse generators 52 and 53 are operated based on the results of these calculations, and actuators 22 and 23 are driven so that lens units L2 and L3 are moved.

By rapidly repeating the sequence of camera shake detection to actuator drive during the period that the camera shutter is open, second lens unit L2 and third lens unit L3 may be quickly moved in the direction appropriate for the compensation for camera shake, and blurring of the image on the film surface may be prevented.

Figure 6:
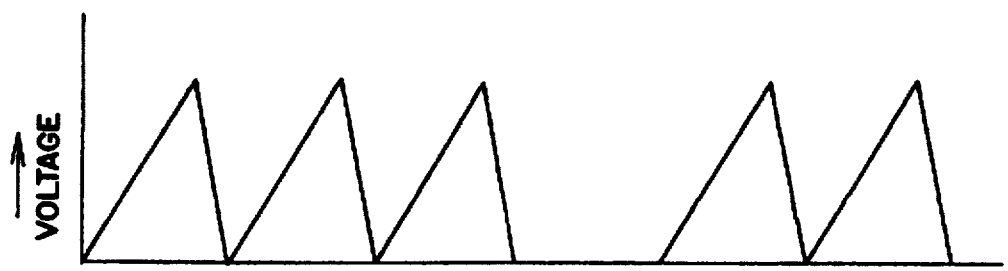
FIG. 6 is a drawing showing another example of a wave form of drive pulses impressed to an electro-mechanical transducer.

In the embodiment explained above, the drive pulses impressed to the actuator's piezoelectric element are drive pulses having a certain wave form pattern as shown in FIG. 5. However, using this pattern, the drive speed is fixed, and power consumption is high. Therefore, the necessary drive speed may be calculated from the detected amount of camera shake, etc., and in response to this calculated drive speed, the driving may be carried out using drive pulses from which a portion is removed, as shown in FIG. 6. Such drive pulses may be generated by providing the drive pulse generator with a drive pulse voltage pattern set in advance in accordance with the drive speed. In this way, the actuator may be driven at a speed matching the calculated drive speed. Moreover, by removing a portion of the drive pulses, power consumption can be reduced.

In addition, in the embodiment explained above, since the drive shaft of the actuator is located at a position away from the center of gravity of the lens holding frame supporting the lens unit comprising the shake prevention optical system, as is clear from FIG. 3, there is a risk that the lens holding frame will vibrate or shake due to a moment arising in the lens holding frame when the actuator operates. If the vibration of the lens holding frame is detected as noise by the x axis position detection sensor and the y axis position detection sensor that detect the position of the lens unit, the lens unit's position is not accurately controlled.

Figure 7:
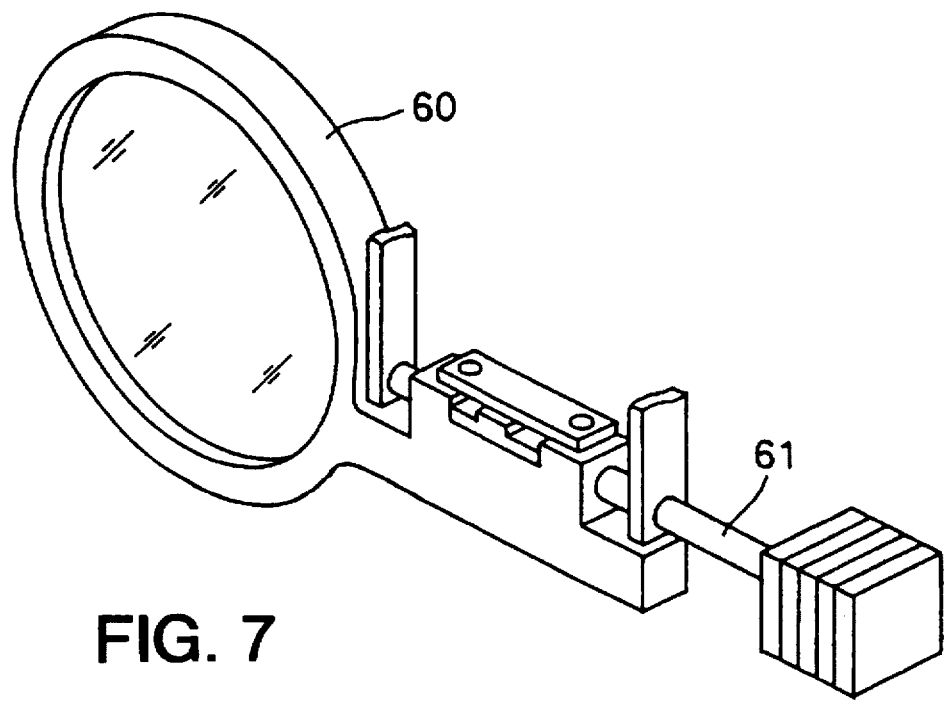
FIG. 7 is a perspective view of another example of a construction of a drive mechanism of a shake prevention optical system.

This problem may be solved by constructing the actuator's drive shaft 61 such that it passes through the center of gravity of lens holding frame 60 as shown in FIG. 7.

As explained above, because this invention, in order to drive a compensation lens that compensates for blurriness of images on the image surface caused by camera shake, employs a drive mechanism comprising a compensation lens holding means equipped with a connector connected via friction to a drive member connected to an electromechanical transducer, the compensation lens drive mechanism becomes small, which allows the size of the construction of the entire lens system to be reduced. Furthermore, there is no noise generated during operation, and a high-quality lens drive device may be provided.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A lens apparatus, comprising:
   an objective lens system;
   a compensation lens system for preventing image blurriness;
   support means for supporting said compensation lens system;
   a driving member coupled to said support means to drive said support means and being disposed such that a moving axis of the driving member passes through a center of gravity of said compensation lens system, said driving member being movable in a direction perpendicular to an optical axis of said objective lens system;
   a transducer fixed to said driving member and being disposed in the same plane as said support means and on the same axis as the moving axis of said driving member, for producing incremental displacement of said driving member responsive to an impressed driving pulse and cumulative displacement comprising a multiple of said incremental displacement in response to plural impressed driving pulses; and
   a pulse generator for generating driving pulses that are applied to said transducer.

2. The lens apparatus as claimed in claim 1, wherein the transducer is a piezoelectric element.

3. The lens apparatus as claimed in claim 1, wherein the driving member is coupled to the support means by a frictional coupling having a predetermined friction force.

4. The lens apparatus as claimed in claim 1, wherein said compensation lens system is a part of the objective lens system.

5. The lens apparatus as claimed in claim 1, wherein said compensation lens system includes two lenses which are movable in mutually perpendicular directions.

6. The lens apparatus as claimed in claim 1, wherein the frequency of said impressed driving pulses is at least 20 kHz.

7. The lens apparatus as claimed in claim 1, further comprising:
   means for selectively removing a portion of said driving pulses responsive to a driving speed calculated for a detected shaking movement of the objective lens system before impressing the driving pulses to the transducer.

8. A lens apparatus as defined in claim 1, further comprising:
   a leaf spring which generates a friction force, whereby said leaf spring is disposed in the same plane as said support means.

9. A lens apparatus, comprising:
   an objective lens system;
   a compensation lens system for preventing image blurriness;
   support means for supporting said compensation lens system;
   a driving member coupled to said support means to drive said support means and being disposed such that a moving axis of the driving member passes through a center of gravity of said compensation lens system, said driving member being movable in a direction perpendicular to an optical axis of said objective lens system;
   a transducer fixed to said driving member and being disposed in the same plane as said support means and on the same axis as the moving axis of said driving member for producing incremental displacement of said driving member responsive to an impressed driving pulse and cumulative displacement comprising a multiple of said incremental displacement in response to plural impressed driving pulses;
   detection means for detecting an amount of shaking movement of said objective lens; and
   a pulse generator for generating driving pulses to be applied to said transducer in accordance with said amount of shake.

10. The lens apparatus as claimed in claim 9, wherein the transducer is a piezoelectric element.

11. The lens apparatus as claimed in claim 9, wherein the driving member is coupled to the support means by a frictional coupling having a predetermined friction force.

12. The lens apparatus as claimed in claim 9, wherein said compensation lens system is a part of the objective lens system.

13. The lens apparatus as claimed in claim 9, wherein said compensation lens system includes two lenses which are movable in mutually perpendicular directions.

14. The lens apparatus as claimed in claim 9, wherein the frequency of said impressed driving pulses is at least 20 kHz.

15. The lens apparatus as claimed in claim 9, further comprising:

means for selectively removing a portion of said driving pulses responsive to a detected amount of shaking movement before impressing said driving pulses to the transducer.

16. A lens apparatus as defined in claim 9, further comprising:

a leaf spring which generates a friction force, whereby said leaf spring is disposed in the same plane as said support means.

17. A lens driving apparatus, comprising:

a lens;

support means for supporting said lens;

a driving member coupled to said support means and disposed such that a moving axis of the driving member passes through a center of gravity of said lens, said driving member being movable in a direction perpendicular to an optical axis of said lens;

a transducer fixed to said driving member and being disposed in the same plane as said support means and on the same axis as the moving axis of said driving member for producing incremental displacement of said driving member responsive to an impressed driving pulse and cumulative displacement comprising a multiple of said incremental displacement in response to plural impressed driving pulses, whereby said lens is driven in a direction perpendicular to an optical axis of the lens; and a pulse generator for generating driving pulses to be applied to said transducer.

18. The lens apparatus as claimed in claim 17, wherein the transducer is a piezoelectric element.

19. The lens apparatus as claimed in claim 17, wherein the driving member is coupled to the support means by a frictional coupling having a predetermined friction force.

20. The lens driving apparatus as claimed in claim 17, wherein said lens is a compensation lens for preventing image blurriness.

21. The lens driving apparatus as claimed in claim 17, wherein the frequency of said impressed driving pulses is at least 20 kHz.

22. The lens driving apparatus as claimed in claim 17, further comprising:

means for selectively removing a portion of said impressed driving pulses responsive to a detected amount of shaking movement of the lens before impressing the driving pulses to the transducer.

23. A lens apparatus as defined in claim 17, further comprising:

a leaf spring which generates a friction force, whereby said leaf spring is disposed in the same plane as said support means.

* * * * *